United States Patent Office 3,287,378
Patented Nov. 22, 1966

3,287,378
18-OXYGENATED STEROIDS AND PROCESS
FOR THEIR MANUFACTURE
Oskar Jeger, Zurich, Duilio Arigoni, Zollikerberg, and Georg Anner and Charles Meystre, Basel, and Albert Wettstein, Riehen, Switzerland, assignors to Ciba Corporation, a corporation of Delaware
No Drawing. Filed Feb. 9, 1960, Ser. No. 7,542
Claims priority, application Switzerland, Feb. 12, 1959, 69,475/59; Apr. 23, 1959, 72,443/59; May 29, 1959, 73,754/59; Dec. 22, 1959, 82,233/59
26 Claims. (Cl. 260—397.3)

The present invention relates to a process for the manufacture of 18-oxygenated steroids from 18-unsubstituted steroids.

The 18-oxygenated steroids, particularly 18-oxygenated pregnanes, are of great interest on account of their interesting physiological effects. To this class of compounds there belongs, inter alia, aldosterone which is of considerable importance owing to its specific effect on electrolytemetabolism. The latter compound, however, is present in the suprarenal glands only in an extremely small amount. Larger quantities could hitherto only be prepared by total synthesis from simple chemical basic substances by a process involving many steps. By the present process it is now possible to obtain 18-oxygenated steroids, particularly 18-oxygenated pregnanes, that is to say aldosterone and its derivaties and related compounds, in a simple manner by direct selective substitution of the angular, non-activated methyl group at the carbon atom 13 in the intact steroid skeleton. In this manner 18-oxygenated steroids can be prepared in any quantity from readily accessible vegetable and animal steroids.

The new process can be divided up into three main parts:

(1) The formation of an 18:20-ether starting from an 18-unsubstituted 20-hydroxypregnane,
(2) The splitting or oxidative conversion of the 18:20-ether into 18-hydroxy or 18-acid derivatives,
(3) The further oxidation of the resulting polyoxygenated 18-hydroxy compounds.

One method of carrying out the process is shown in the following diagram of partial formulae using an 11-oxygenated compound as example:

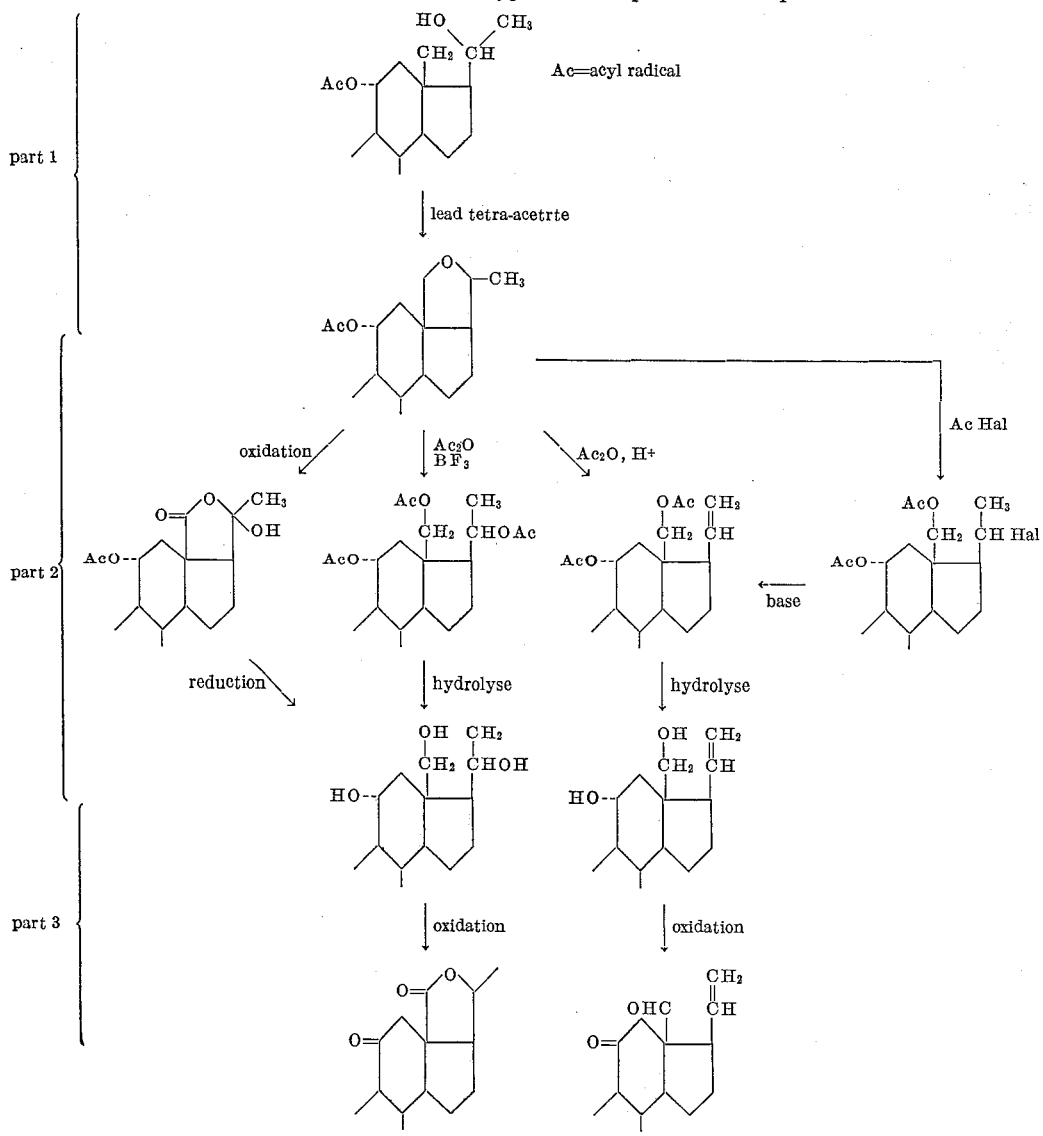

The present application concerns especially the second part of the above described process, viz. mainly the splitting by acylation of 18:20-oxido-steriods. The third part is described in copending application Serial No. 7,543, filed concurrently herewith, now U.S. Patent No. 3,234,212, and covering conversion to aldosterone and related compounds.

It has been found that derivatives of 18-hydroxy-pregnanes can be obtained in a simple manner by subjecting an 18:20-oxido-pregnane, if desired with the addition of an acidic catalyst, to the action of an acylating agent and, if desired, hydrolysing the resulting 18-acyloxy-pregnanes to form 18-hydroxy-pregnanes and/or oxidizing the 18-hydroxyl group in resulting $\Delta^{20}$-pregnenes and/or hydroxylating the 20:21-double bond.

As acylating agents are suitable, for example, aliphatic carboxylic acid anhydrides, such as acetic acid anhydride, propionic acid anhydride, butyric acid anhydride or caproic acid anhydride, it being of advantage to add an acidic catalyst. Depending on the catalyst, cleavage can lead either to $\Delta^{20}$-18-acyloxy-pregnenes or to 18:20-diacyloxy-pregnanes. Thus, for example, with a Lewis acid, such as boron trifluoride, ferric chloride, aluminum chloride or zinc chloride, there are obtained predominantly 18:20-diacyloxy-pregnanes, whilst, especially at a somewhat raised temperature, with the addition of a strong acid, for example sulfuric acid or para-toluene-sulfonic acid, $\Delta^{20}$-18-acyloxy-pregnenes are mainly formed. If there are any oxo groups, for example in the 3-position, of the starting materials used, they are converted into enol acylates during treatment.

In addition there may be used for the cleavage of 18:20-ethers also acid halides, for example aliphatic carboxylic acid halides, such as acetyl chloride, acetyl bromide, chloracetyl bromide or propionyl bromide. In the course of the reaction 18-acyloxy-20-halides are formed which, on treatment with an alkali, such as potassium hydroxide, sodium carbonate or silver acetate, readily pass over again into 18:20-oxido-compounds. With the aid of a tertiary organic base, such as collidine or pyridine, the 18-acyloxy-20-halogen-pregnanes can be converted into $\Delta^{20}$-18-acyloxy-pregnenes. These compounds are also obtained by heating 18:20-oxido-steroids at a raised temperature, e.g. at about 150° C. with an aromatic acid chloride, for example with benzoyl chloride.

The $\Delta^{20}$-pregnenes with an acyloxy radical in the 18-position can be converted into the corresponding 18-acyloxy-20:21-dihydroxy-steroids by treatment with a hydroxylating agent, such as osmium tetroxide, phenyl-iodoso acetate, hydrogen peroxide in the presence of a catalytic quantity of osmium tetroxide or potassium permanganate. From the resulting compounds there may be obtained 18:20:21-trihydroxy-steroids by alkaline or acid hydrolysis.

The 18:20-diacyloxy-steroids obtained by splitting the 18:20-oxido-steroids can be converted into 18:20-dihydroxy compounds, for example by alkaline hydrolysis, other acyloxy groups, for example in the 3-and/or 11-position, also being hydrolysed simultaneously.

For the oxidation of a free 18-hydroxy group in resulting $\Delta^{20}$-pregnenes there is preferably used an oxidizing agent with which double bonds are not attacked, for example chromium trioxide in pyridine or an N-halogenamide or -imide, for example N-bromacetamide, N-chlorosuccinimide or N-bromosuccinimide.

Particularly suitable stating materials for the present process are 18:20-oxido-compounds of the 5α- and 5β-pregnane series which may contain further substituents in the ring system, especially in one or more of the positions 1, 2, 3, 4, 5, 6, 7, 8, 9, 10, 11, 12, 14, 15, 16, 17 and 21, such as free or functionally converted hydroxy or oxo groups, alkyl groups such as methyl groups, or halogen atoms. By functionally converted hydroxy or oxo groups there are to be understood esterified or etherified hydroxy groups and ketalized oxo groups respectively. In addition, the starting materials may contain double bonds, particularly in 4:5-, 5:6- and/or 9:11-position. These starting materials are obtained by the process described in patent application No. 7,525, filed concurrently herewith, now U.S. Patent No. 3,247,188, for example by subjecting the corresponding 20-hydroxy compounds to the action of lead tetra-acetate.

Resulting compounds which have no oxygen function in the 11-position can be hydroxylated in the 11-position in known manner with the aid of micro-organisms. This succeeds particularly well in the case of compounds which contain the $\Delta^4$-3-keto grouping. In the compounds of the process which have free hydroxyl groups, e.g. in the 18- and 20-positions, these groups can be esterified or etherified in the usual manner.

The present invention further concerns the new $\Delta^{20}$-18-hydroxy-steroids, 18:20-dihydroxy-steroids, 18:20:21-trihydroxy-steroids, especially the $\Delta^{20}$-3:18-dihydroxy-pregnenes, 3:18:20-trihydroxy-pregnanes, 3:18:20:21-tetrahydroxy-pregnanes, the esters and ethers of these compounds, and $\Delta^{20}$-18-oxo-pregnenes, such as $\Delta^{20}$-3:18-dioxo-5α-pregnene and $\Delta^{20}$-3:11:18-trioxo-5β-pregnene obtained from 18:20-oxido-steroids by the process of the invention.

As esters there are especially to be mentioned those deriving from carboxylic acids having from 1 to 20 carbon atoms and pertaining to the aliphatic, the aromatic, the cycloaliphatic, the aliphatic-aromatic and aliphatic-cycloaliphatic series, such as acetic, propionic, butyric, trifluoracetic, hexahydrobenzoic, cyclopentylpropionic, benzoic, furoic acid etc. There can however also be employed heterocyclic carboxylic acids, sulfonic acids and mineral acids.

In the ethers the hydrocarbon residues are preferably those of lower saturated or unsaturated members of the aliphatic series, preferably those having from 1 to 8 carbon atoms, such as, methyl, ethyl, propyl, vinyl, allyl etc. and of mononuclear heterocyclic hydrocarbons such as tetrahydropyran, and of aliphatic-aromatic hydrocarbons, such as the benzyl radical.

The following examples illustrate the invention:

*Example 1*

1.0 gram of 3β-acetoxy-18:20β-oxido-5α-pregnane is heated for one hour at 150° C. with 5 cc. of benzoyl chloride under nitrogen. The mixture is then carefully poured onto water, taken up in ether and worked up. The reaction product is hydrolysed, without any further purification, by boiling with a methanolic potassium hydroxide solution of 5% strength. $\Delta^{20}$-3β:18-dihydroxy-5α-pregnene is obtained which exhibits in the infrared spectrum (CHCl₃) bands at 2.86μ (hydroxyl group), 6.06 and 11.05μ (vinyl group).

Oxidation of $\Delta^{20}$-3β:18-dihydroxy-5α-pregnene with osmium tetroxide yields 3β:18:20ξ:21-tetrahydroxy-5α-pregnane.

*Example 2*

Treatment of 1 gram of 3β-acetoxy-18:20β-oxido-5α-pregnane with acetic anhydride in the presence of boron trifluoride etherate at room temperature, followed by alkaline hydrolysis of the reaction product and chromatographic purification of the resulting mixture on silica gel. yields 3β:18:20α-trihydroxy-5α-pregnane in addition to the aforementioned $\Delta^{20}$-3β:18-dihydroxy-5α-pregnene.

*Example 3*

300 mg. of 3β-acetoxy-18:20β-oxido-5α-pregnane are dissolved at room temperature in 10 cc. of acetic anhydride, mixed with 20 drops of freshly distilled boron trifluoride etherate and allowed to stand for 30 minutes. The reaction mixture is then cautiously treated with ice water, taken up in ether and the ethereal solution washed exhaustively with dilute sodium bicarbonate solution. After working up in the usual manner, 310 mg. of amorphous 3β:18:20α-triacetoxy-5α-pregnane which is saturated towards tetranitromethane are obtained; without being purified the product is hydrolysed with 20 cc. of methanolic potassium hydroxide solution of 5% strength for one hour on a water bath. Working up yields 290 mg. of crystals which melt sharply at 212–213° C. after being recrystallized 4 times from dilute methanol. Optical rotation $[\alpha]_D = +35.4°$ (in methanol); infrared absorption spectrum in Nujol; strong bands at $3.08\mu$ (hydroxyl), no bands in the carbonyl region. The product is $3\beta:18:20\alpha$-trihydroxy-$5\alpha$-pregnane.

*Example 4*

To open up the $18:20\beta$-oxide ring 1 gram of $3\alpha:11\alpha$-diacetoxy-$18:20\beta$-oxido-$5\beta$-pregnane is dissolved in 50 cc. of acetic anhydride and 0.3 cc. of freshly distilled boron trifluoride etherate is added to the solution which is worked up after 90 minutes at 15° C. as described in Example 3; the crude $3\alpha:11\alpha:18:20\alpha$-tetra-acetoxy-$5\beta$-pregnane is purified by chromatography on silica gel.

To convert this product into $3\alpha:11\alpha:18:20\alpha$-tetrahydroxy-$5\beta$-pregnane 1 gram of the tetra-acetate is hydrolysed for 2 hours at 50° C. with 100 cc. of 0.1 N-methanolic potassium hydroxide solution. The resulting tetrol yields on treatment with triphenylchloromethane and pyridine on a water bath the crystalline 18-monotriphenylmethyl ether of $3\alpha:11\alpha:18:20\alpha$-tetrahydroxy-$5\beta$-pregnane.

In an analogous manner there is obtained $3\beta:18:20$-trihydroxy-$11\beta$-acetoxy-$5\alpha$-pregnane by treating $3\beta:11\beta$-diacetoxy-$18:20$-oxido-$5\alpha$-pregnane with boron trifluoride etherate in acetic anhydride and hydrolysis with potassium hydroxide solution.

*Example 5*

1 gram of $\Delta^5$-3-ethylenedioxy-$11\alpha$-acetoxy-$18:20\beta$-oxido-pregnene dissolved in 75 cc. of acetic anhydride is treated with 0.3 cc. of freshly distilled boron trifluoride etherate and the solution allowed to stand for 2 hours at 18° C. 150 cc. of ice-cold water are then cautiously added to the mixture which is then heated for one hour at 50° C. and worked up in the customary manner. After purification by chromatography on a column of 100 grams of silica gel, 725 mg. of crystalline $\Delta^4$-3-keto-$11\alpha:18:20\alpha$-triacetoxy-pregnene are obtained which is identified by its characteristic bands in the infra-red absorption spectrum (chloroform) at $5.78\mu$ (acetate groups C-11, C-18 and C-20), and the doublet of the $\alpha:\beta$-unsaturated ketone grouping of the ring A ($5.94/6.19\mu$). When subjected to alkaline hydrolysis with 0.1 N-methanolic potassium hydroxide solution at room temperature it yields the free $\Delta^4$-3-keto-$11\alpha:18:20\alpha$-trihydroxy-pregnene.

*Example 6*

A solution of 1 gram of $\Delta^5$-3-ethylenedioxy-$11\alpha$-acetoxy-$18:20\beta$-oxido-pregnene in 100 cc. of glacial acetic acid is treated with a trace of freshly molten zinc chloride and heated for 20 hours at a gentle boil. The reaction mixture is then diluted with water, taken up in ether and worked up. Chromatographic purification over aluminum oxide of activity II yields 580 mg. of $\Delta^{4:20}$-3-keto-$11\alpha:18$-diacetoxy-pregnadiene which, when subjected to alkaline hydrolysis with 20 cc. of 0.1 N-methanolic potassium hydroxide solution at room temperature, yields 521 mg. of crystalline $\Delta^{4:20}$-3-keto-$11\alpha:18$-dihydroxy-pregnadiene. This product turns tetranitromethane yellow and exhibits in the infra-red spectrum (chloroform) the following bands: $2.84\mu$ (hydroxyl), doublets at $5.94/6.18\mu$ ($\Delta^4$-3-ketone) and $6.08/10.99\mu$ (vinyl group C-20).

*Example 7*

A solution of 627 mg. of crude $\Delta^5$-3-ethylenedioxy-$11\alpha$-acetoxy-$18:20$-oxido 20-methyl-pregnene in 30 cc. of acetic anhydride is treated with 0.2 cc. of boron trifluoride etherate, and the whole allowed to stand for 2 hours at room temperature. The reaction solution is poured on to ice and, after the excess acetic anhydride has been destroyed, taken up in ether, washed with 2 N-sodium carbonate solution and water until neutral, dried and evaporated. The resulting $\Delta^{4:20}$-3-keto-$11\alpha:18$-diacetoxy-20-methyl-pregnadiene is dissolved in 50 cc. of 0.2 N-methanolic 80% potassium hydroxide solution with slight heating and then kept overnight at room temperature under nitrogen. After diluting with 100 cc. of water, the reaction mixture is taken up in ether and washed with saturated sodium chloride solution until neutral. The evaporated solution yields 605 mg. of crude $\Delta^{4:20}$ - 3 - keto-$11\alpha:18$-dihydroxy-20-methyl-pregnadiene which is purified by chromatography on silica gel.

If this compound is treated, for example with osmium tetroxide, and the resulting 20:21-glycol split, for example with lead tetra-acetate, there is obtained $\Delta^4$-3:20-diketo-$11\alpha:18$-dihydroxy-pregnene.

*Example 8*

250 mg. of pure $3\alpha:11\alpha$-diacetoxy-$18:20\beta$-oxido-$5\beta$-pregnane are covered with 3 cc. of acetic anhydride, 0.1 cc. of freshly distilled boron trifluoride etherate is added, whereupon a complete solution is rapidly obtained. After a short time the solution is treated with a small amount of ice and evaporated under reduced pressure. The residue is dissolved in benzene, the solution filtered through 3 grams of aluminum oxide (activity II) and the benzene solutions again evaporated under reduced pressure. The residue crystallizes from a mixture of ether and pentane in coarse, heavy crystals melting at 160–162° C. The resulting $3\alpha:11\alpha:18:20\alpha$-tetra-acetoxy-$5\beta$-pregnane exhibits in the infrared spectrum (methylene chloride) bands inter alia at $5.77\mu$, $7.32\mu$, $8.12\mu$ and $9.75\mu$. In admixture with $3\alpha:11\alpha$-diacetoxy-$18:20\beta$-oxido-$5\beta$-pregnane, which has practically an identical melting point, there is obtained a strong depression of the melting point.

When the above tetra-acetate is hydrolysed with methanolic potassium hydroxide solution of 2.5% strength it yields $3\alpha:11\alpha:18:20\alpha$-tetrahydroxy-$5\beta$-pregnane melting at 220–230° C. (from acetone or acetone and pentane). Infra-red bands (in Nujol) at $3.04\mu$, $9.46\mu$, $9.64\mu$ and $9.81\mu$.

*Example 9*

11.5 grams of a crude mixture of $3\alpha:11\alpha$-diacetoxy-$18:20\beta$-oxido-$5\beta$-pregnane and $3\alpha:11\alpha:20\beta$-triacetoxy-$5\beta$-pregnane are suspended in 300 cc. of acetic acid anhydride, cooled to 0° C., and 15 cc. of a mixture of 45 cc. of acetic acid anhydride and 15 cc. of boron trifluoride etherate are added with stirring. After 20 minutes 6.0 grams of crystalline sodium acetate are added, whereupon the solution turns from dark brown to pale yellow. After 15 minutes the mixture is suction-filtered and the residue washed with cold ether. 3.36 grams of $3\alpha:11\alpha:20\beta$-triacetoxy-$5\beta$-pregnane melting at 252–258° C. are obtained.

The filtrate is evaporated to dryness at a water-jet vacuum, the residue taken up in methylene chloride and the solution washed with water, dilute sodium bicarbonate solution and water, dried and evaporated. The resulting crude product is chromatographed through 250 grams of aluminum oxide. With a mixture of benzene and hexane (1:2) oily products are first eluted, then a further quantity of the above $3\alpha:11\alpha:20\beta$-triacetate. From the fraction (6000 cc.) eluted with pure benzene there are obtained by crystallization from a mixture of ether and pentane 2.55 grams of pure $3\alpha:11\alpha:18:20\alpha$-tetra-acetoxy-$5\beta$-pregnane melting at 158–159° C. From the mother liquor approximately another 500 mg. of somewhat less pure tetraacetate separate.

1.82 grams of $3\alpha:11\alpha:18:20\alpha$-tetraacetoxy-$5\beta$-pregnane are added to a solution of 1.4 grams of potassium hydroxide in 70 cc. of methanol, and the whole heated for 3 hours under nitrogen at 50° C. 3.5 cc. of glacial acetic acid are then added, the mixture diluted with methylene chloride and the solution washed with dilute sodium chloride solution. The aqueous washings are extracted with a mixture of chloroform and alcohol (3:1). The combined organic extracts are dried and evaporated at a water-jet vacuum. By crystallizing the residue from a mixture of methanol and ether there are obtained 1.23 grams of pure 3α:11α:18:20α-tetrahydroxy-5β-pregnane melting at 210–215° C.

When, instead of the product used as starting material in this example, there is used the isomeric 3α:11α-diacetoxy-18:20α-oxido-5β-pregnane which is formed on oxidation of the corresponding 20α-hydroxy compound with lead tetra-acetate, there is obtained in analogous manner 3α:11α:18:20β-tetrahydroxy-5β-pregnane melting at 208–216° C.

*Example 10*

1.0 gram of 3α:11α-di-hexahydrobenzoyloxy-18:20β-oxido-pregnane is suspended in 15 cc. of acetic acid anhydride, and after cooling to 5° C., a mixture of 0.55 cc. of acetic acid anhydride and 0.2 cc. of boron trifluoride etherate is added after stirring for 20 minutes at 0° C. to 5° C., 300 mg. of crystalline sodium acetate are added and the whole then evaporated to dryness at a water-jet vacuum. The residue consisting of crude 3α:11α-dihexahydrobenzoyloxy-18:20α-diacetoxy-5β-pregnane is dissolved in 75 cc. of absolute methanol and, after adding 1.5 grams of anhydrous sodium methylate, the whole is allowed to stand for 48 hours at 25–30° C. The mixture is then acidified with 2 cc. of glacial acetic acid and worked up as described in Example 9. By crystallization from a mixture of methanol and ether there is obtained pure 3α:11α:18:20α-tetrahydroxy-5β-pregnane melting at 210–215° C.

By analogous treatment of 3α:11α-dipivalyloxy-18:20β-oxido-5β-pregnane with boron trifluoride and acetic acid anhydride and subsequent hydrolysis with methanolic potassium hydroxide solution as described in Example 9, 3α:11α:18:20α-tetrahydroxy-5β-pregnane melting at 210–215° C. is obtained.

*Example 11*

1.0 gram of crude 3α:11α-diacetoxy-18:20β-oxido-5β-pregnane is dissolved in 10 cc. of acetyl bromide and allowed to stand for 14 hours at room temperature with the exclusion of moisture. Benzene is added to the dark colored reaction mixture and evaporation performed under reduced pressure. The resulting crude product (1.2 grams) is then chromatographed over neutral aluminum oxide of activity II. After recrystallization of the appropriate fractions once from a mixture of ether and petroleum ether there are obtained in addition to 415 mg. of the 3α:11α:20β-triacetoxy-5β-pregnane melting at 250–255° C. contained in the starting material, a total of 735 mg. of pure 3α:11α:18-triacetoxy-20α-bromo-5β-pregnane. The product melts at 171–172° C. and exhibits in the infra-red spectrum the following bands: 5.80μ, 8.06μ, and complex broad bands at 9.60–9.75μ.

On treating 335 mg. of 3α:11α:18-triacetoxy-20α-bromo-5β-pregnane in 10 cc. of methanol with 335 mg. of silver acetate and 2 drops of water for 2 hours on a boiling water bath, a reaction mixture is obtained from which after cooling, filtration and washing the filtrate with water and extracting with ether, 232 mg. of pure crystalline 3α:11α-diacetoxy-18:20β-oxido-5β-pregnene melting at 159–162° C. in the form of fine needles are obtained.

A solution of 390 mg. of 3α:11α:18-triacetoxy-20α-bromo-5β-pregnane in 20 cc. of freshly distilled collidine is boiled under reflux for 6 hours. After another 8 hours at room temperature the yellow reaction solution is poured on to a mixture of ice water and ether, the organic layer is washed successively with dilute sulfuric acid, water, saturated sodium bicarbonate solution and water, dried and evaporated under reduced pressure. The resulting 350 mg. of crude product are chromatographed through neutral aluminum oxide (activity II), 305 mg. of a crystalline compound with positive tetranitomethane reaction being eluted. After recrystallization once from a mixture of ether and hexane 210 mg. of $\Delta^{20}$-3α:11α:18-triacetoxy-5β-pregnene melting at 130–131.5° C. are obtained. From the mother liquor another 25 mg. of the same compound are obtained. The resulting product gives a strong depression of the mixed melting point with the starting material and shows a nuclear magnetic resonance spectrum corresponding to its constitution. In the infra-red spectrum the following bands are exhibited: 5.79μ, 5.25μ, 5.3μ, 8.05μ 9.60μ–9.75μ, 10.25μ, 12.00μ.

50 mg. of $\Delta^{20}$-3α:11α:18-triacetoxy-5β-pregnene are dissolved in 6 cc. of methanol and after the addition of 150 mg. of potassium hydroxide in 1 cc. of water boiled for 1½ hours on a water bath. The cooled reaction solution is diluted with water, treated with sodium chloride and worked up with a mixture of ether and methylene chloride. 35 mg. of amorphous $\Delta^{20}$-3α:11α:18-trihydroxy-5β-pregnene was isolated exhibiting the following bands in the infra-red spectrum: 2.75μ, .65μ, 10.68μ. The product is used for the subsequent reaction without any further purification.

A solution of 33 mg. of $\Delta^{20}$-3α:11α:18-trihydroxy-5β-pregnene in 1 cc. of pyridine is added to 35 mg. of chromium trioxide in 1 cc. of pyridine and the whole allowed to stand overnight at room temperature. After the addition of 2 cc. of methanol the reaction mixture is poured on to ice water and stirred for 20 minutes. Extraction is then carried out with a mixture of methylene chloride and ether. The solution is washed until neutral and dried and then evaporated in vacuo to yield 27 mg. of a slightly colored crystalline product. The latter is chromatographed through 75 times its weight of neutral aluminum oxide of activity II. 14.5 mg. of colorless crystals are obtained with a mixture of benzene and ethyl acetate. After being recrystallized three times from methanol (methylene chloride-methanol) $\Delta^{20}$-5β-pregnene-3:11:18-trione melts unsharply at 150–160° C. with decomposition. In the infrared spectrum it exhibits bands at 3.65μ and 5.85μ.

*Example 12*

A solution of 150 mg. of 3:11-diketo-18:20β-oxido-5β-pregnane in 10 cc. of acetic anhydride is treated with 10 drops of boron trifluoride-ether complex and allowed to stand for 30 minutes at room temperature. The mixture is then poured on to water, taken up in ether and the organic phase washed several times with water. On evaporating the solvent 150 mg. of a brown colored crude product are obtained which is heated for one hour under reflux with 15 cc. of methanolic potassium hydroxide solution of 5% strength for the purpose of hydrolysis. Ordinary working up yields 130 mg. of a product which is chromatographed on aluminum oxide of activity II. The fractions (59 mg.) eluted with a mixture of benzene and ether (3:1) are recrystallized from acetone-heptane. 3:11-diketo-18:20α-dihydroxy-5β-pregnane melts at 205–206° C. Optical rotation [α]$_D$=+78°. Infrared bands at 2.76μ, 2.86μ, 3.04–3.13μ, 5.85μ in Nujol.

*Example 13*

100 mg. of 3α:11α-dibenzoyloxy-18:20β-oxido-5β-pregnane suspended in 2 cc. of acetic anhydride are treated with 0.42 cc. of a solution of boron trifluoride etherate in acetic anhydride (2 cc. of acetic anhydride, 0.2 cc. of boron trifluoride etherate), and the whole is stirred at approximately 5° C. until dissolution is complete. 260 mg. of crystalline sodium acetate are added to the slightly yellowish solution and the mixture stirred for one hour at room temperature. The mixture is evaporated under reduced pressure after the addition of methanol and benzene, the residue taken up in water-ether and washed until neutral. After evaporating the dried ethereal solution under reduced pressure, 132 mg. of an amorphous substance are isolated. The product is 3α:11α-dibenzoyloxy-18:20α-diacetoxy-5β-pregnane.

In the infrared spectrum the compound exhibits absorption bands at 5.80 and 5.86, 6.26, 6.34, 8.07, 8.50 and 9.0μ. By hydrolysis under the conditions described in Example 9, 3α:11α:18:20α-tetrahydroxy-5β-pregnane melting at 210–215° C. is obtained.

*Example 14*

0.035 cc. of boron trifluoride ethereate is added to a solution of 100 mg. of pure Δ⁴-3:11-diketo-18:20β-oxido pregnene in 1 cc. of acetic anhydride, stirred for 15 minutes at room temperature and after the addition of 5 cc. of methanol and 4 drops of pyridine stirred for 15 minutes with cooling and poured on to water. The mixture is taken up in ether, washed with saturated sodium bicarbonate solution and water, dried and evaporated under reduced pressure. The residue (123 mg.) is a mixture of Δ⁴-3:11-diketo-18:20α-diacetoxy-pregnene and Δ³·⁵-3:18:20α-triacetoxy-11-keto-pregnadiene. The mixture is dissolved in 10 cc. of methanol and after the addition of a solution of 120 mg. of potassium carbonate in 0.5 cc. of water allowed to stand for 3 days at room temperature under nitrogen. The solution is then poured on to ice, acidified, saturated with sodium chloride and extracted with ether. From the ethereal extract (72 mg.) there are obtained by crystallization from ether 36 mg. of Δ⁴-3:11-diketo-18:20α-dihydroxy-pregnene melting at 197–200° C. Infrared spectrum: bands at 2.75 and 2.88; 5.90, 6.02μ and 6.24; 9.05, 11:50μ.

*Example 15*

500 mg. of 3β-acetoxy-18:20β-oxido-5α-pregnane are dissolved in 15 cc. of acetic anhydride, treated with 30 drops of boron trifluoride-ether complex and allowed to stand for 30 minutes at room temperature. After working up in the customary manner with ether, the resulting crude product (692 mg.) is filtered in benzene through a column of neutral aluminum oxide (activity II). The resulting oil (645 mg.) is recrystallized three times from methanol-water and yields 3β:18:20α-triacetoxy-5α-pregnane having a constant melting point of 105–106° C. Optical rotation: $[\alpha]_D = -23°$; infra-red spectrum: bands at 5.78 and 7.97μ in $CHCl_3$.

For hydrolysis 600 mg. of this triacetate are boiled under reflux for one hour in 15 cc. of methanolic potassium hydroxide solution of 5% strength. 15 cc. of water are added dropwise to the boiling solution to yield 320 mg. of 3β:18:20α-trihydroxy-pregnane in the form of crystals which have a constant melting point at 223–225° C. after being recrystallized three times from methanol-water. Optical rotation: $[\alpha]_D = +35°$ (in methanol).

*Example 16*

110 mg. of para-toluene-sulfonic acid are added to 200 mg. of 3β-acetoxy-18:20β-oxido-5α-pregnane dissolved in 25 cc. of acetic anhydride, and the solution boiled under reflux for one hour. The reaction mixture is poured on to ice, taken up in ether and the organic phase washed with saturated sodium bicarbonate solution and water. After evaporating the solvent, an oil is obtained which cannot be crystallized. This crude product is boiled under reflux in 20 cc. of tetrahydrofuran with 265 mg. of lithium aluminum hydride for one hour. After working up in the usual manner the resulting alcohol mixture (206 mg.) is chromatographed on neutral aluminum oxide (activity II). With a mixture of benzene and ether (9:1) Δ²⁰-3β:18-dihydroxy-5α-pregnene (65 mg.) is eluted which gives a gaint yellow color with tetranitromethane and, after being recrystallized three times from acetone-heptane, has a constant melting point of 157–158° C. Optical rotation: $[\alpha]_D = +7°$. Infra-red spectrum: bands at 3.01; 6.10 and 11.11μ.

With a mixture of benzene and ether (1:1) 90 mg. of 3β:18:20α-trihydroxy-5α-pregnane are eluted from the column which, after being recrystallized from methanol-water, melt at 225° C.

120 mg. of osmium tetroxide are added to a solution of 116 mg. of the oily crude Δ²⁰-3β:18-diacetoxy-5α-pregnene in 10 cc. of pyridine and 10 cc. of absolute ether and the mixture allowed to stand for 4 days at room temperature. The solvent is then evaporated at a water-jet vacuum, the residue (244 mg.) dissolved in 8 cc. of benzene and 15 cc. of ethanol, the solution treated with 800 mg. of mannitol in 20 cc. of 2 N-sodium hydroxide solution and the mixture boiled for 4 hours under reflux. Usual working up with ether yields 106 mg. of a crude product which is dissolved without further purification in 6 cc. of pyridine and 25 cc. of methanol and treated with a solution of 900 mg. of periodic acid in 5 cc. of water. After 30 minutes at room temperature, the oxidation mixture is extracted with ether, the organic phase washed twice with aqueous sodium bicarbonate solution and worked up in the usual way. A portion of the resulting crude product is chromatographed on neutral aluminum oxide of activity II. The benzene eluates crystallize on being sprinkled with methanol. After being recrystallized three times from a mixture of acetone and hexane the hemiacetal of 3β:18-dihydroxy-17β-formyl-androstane has a constant melting point of 191–193° C. Optical rotation $[\alpha]_D = +34°$ (in chloroform; c.=0.96); infra-red spectrum: strong bands at 2.86μ in Nujol (no carbonyl bands!).

54 mg. of this crude hemiacetal are dissolved in 5 cc. of glacial acetic acid and after the addition of 85 mg. of sodium chromate in 5 cc. of glacial acetic acid allowed to stand for 2 days at room temperature. Working up in the usual manner yields 50 mg. of a crude product which is chromatographed on neutral aluminum oxide of activity II. With a mixture of petroleum ether and benzene a total of 23 mg. of crystals are eluated. After being recrystallized twice, the 20:18-lactone of 3-keto-18-hydroxy-5α-etianic acid melts at 240–242°. Optical rotation $[\alpha]_D = +35°$ (in chloroform; c.=0.73); infra-red spectrum: bands at 5.67 and 5.84μ in potassium bromide.

100 mg. of sodium boron hydride are added to a solution of 41 mg. of this lactone in 10 cc. of absolute dioxane and the mixture boiled under reflux for 2 hours, poured on to dilute sulfuric acid and worked up in the usual manner with ether. Acetylation of the non-crystalline reduction product with acetic anhydride-pyridine (1:1) at 60° C. yields 37 mg. of an oil which is chromatographed on aluminum oxide of activity II. The benzene eluates from dilute methanol yield the 20:18-lactone of 3β-acetoxy-18-hydroxy-5α-etianic acid melting at 159–160° C.

*Example 17*

100 mg. of Δ²⁰-3β:18-dihydroxy-5α-pregnene, dissolved in 3 cc. of pyridine, are added to 200 mg. of chromium trioxide in 2cc. of pyridine and the mixture allowed to stand for 2½ hours at room temperature. After adding a little methanol and working up in the usual manner with ether, 82 mg. of a neutral oil are obtained which gives a positive color reaction with Tollens' reagent and is chromatographed for purification on aluminum oxide of activity II. The non-crystalline eluates from petroleum ether-benzene (1:1) which contain Δ²⁰-3:18-dioxo-5α-pregnene are distilled at 140° C. block temperature in a high vacuum. Optical rotation $[\alpha]_D = +32°$; infra-red spectrum: bands at 3.68 and 5.65μ in chloroform.

*Example 18*

163 mg. of para-toluene-sulfonic acid are added to a solution of 300 mg. of 3-keto-18:20β-oxido-5α-pregnane in 20 cc. of acetic anhydride and the mixture boiled under reflux for one hour. It is then poured onto ice and worked up with ether in the usual manner. The resulting crude product (400 mg.) shows a positive color reaction with tetranitromethane and for further purifiication is chromatographed on neutral aluminum oxide of activity II. Δ²·²⁰-3:18-diacetoxy-5α-pregnadiene (240 mg.) eluted with a mixture of petroleum ether and benzene (1:1) crystallizes on being sprinkled with methanol and after being recrystallized from hexane shows a constant melting point at 149–151° C. Optical rotation $[\alpha]_D = +54°$; infra-red spectrum: bands at 5.70, 5.80, 5.90, 6.10 and 10.92μ in Nujol.

200 mg. of Δ²:²⁰-3:18-diacetoxy-5α-pregnadiene are hydrolysed by being heated for 1 hour under reflux with 20 cc. of methanolic potassium hydroxide solution of 5% strength. After working up in the usual manner, 196 mg. of a crude product are obtained which is chromatographed on neutral aluminum oxide of activity III. With benzene and a mixture of benzene and ether (9:1) 183 mg. of Δ²⁰-18-hydroxy-3-keto-5α-pregnene are eluted whose melting point remains constant at 197–198° C. after being recrystallized three times from dilute methanol. Optical rotation $[\alpha]_D = +51°$; infra-red spectrum: bands at 2.91, 2.98, 5.89, 6.04 and 11.50μ in Nujol.

*Example 19*

160 mg. of para-toluene-sulfonic acid are added to a solution of 294 mg. of 3:11-diketo-18:20β-oxido-5β-pregnane in 10 cc. of acetic anhydride and the mixture boiled under reflux for 30 minutes, allowed to cool and poured on to water, taken up in ether and the organic phase washed several times with water. After evaporation of the solvent, the resulting crude product (378 mg.) is hydrolysed by being boiled for one hour with 200 cc. of methanolic potassium hydroxide solution of 5% strength. Working up in the usual way yields 262 mg. of crystals which are chromatographed on aluminum oxide of activity II for further purification. 25 mg. of unchanged starting material are eluted with benzene. Δ²⁰-3:11-diketo-18-hydroxy-5β-pregnene (180 mg.) eluted with a mixture of benzene and ether (9:11) crystallizes from acetone and heptane and, after being recrystallized three times, shows a constant melting point at 157–158° C. Optical rotation: $[\alpha]_D = +43°$; infra-red spectrum: bands at 2.89, 5.86, 6.10 and 10.91μ in Nujol.

The portions (79 mg.) eluted with a mixture of ether and methanol (1:1) melt at 202–203° C. and are 3:11-diketo-18:20α-dihydroxy-5β-pregnane.

A solution of 29 mg. of Δ²⁰-3:11-diketo-18-hydroxy-pregnene in 1 cc. of pyridine is added to a suspension of 60 mg. of chromium trioxide in 1 cc. of pyridine and allowed to stand for 2 hours at room temperature. After adding a little methanol the mixture is poured on to water, extracted with ether and the organic phase washed with 2 N-sodium hydroxide solution and with water. Evaporation of the solvent yields 33 mg. of Δ²⁰-3:11:18-trioxo-5β-pregnene which, on being recrystallized three times from a mixture of acetone and heptane, melts at 198–199° C. Optical rotation: $[\alpha]_D = +56°$; infra-red spectrum: bands at 3.66, 5.83, 6.10 and 10.86μ in Nujol.

35 mg. of Δ²⁰-3:11:18-trioxo-pregnene are dissolved in 20 cc. of absolute benzene, the solution treated with 0.3 cc. of ethylene glycol and 10 mg. of para-toluene-sulfonic acid and boiled under reflux for 3 hours with stirring. After adding 3 cc. of pyridine, ordinary working up yields 35 mg. of a non-crystalline product which, without further purification, is reduced for 1 hour under reflux with 300 mg. of lithium aluminum hydride in 200 cc. of absolute dioxane. The excess reducing agent is destroyed with a little water, the mixture treated with sufficient 2 N-sulfuric acid to produce a clear solution, and the reaction product extracted with ether. In this way 37 mg. of an amorphous product are obtained which is treated with 10 cc. of acetic acid of 50% strength for 30 minutes on a water bath to bring about complete hydrolysis of the ketal groupings. To remove the solvent evaporation is performed at a water-jet vacuum repeatedly with the addition of benzene, and the residue chromatographed on aluminum oxide of activity II. Elution with benzene and a mixture of benzene and ether (9:1) produce 14 mg. of the hemiacetal of Δ²⁰-3:18-dioxo-11β-hydroxy-5β-pregnene melting at 154–155° C. after being recrystallized twice from a mixture of acetone and heptane. Optical rotation: $[\alpha]_D = +53°$; infra-red spectrum: bands at 2.96, 5.92, 6.10 and 11.10μ in Nujol.

50 mg. of this hemiacetal dissolved in 3 cc. of pyridine are added to a suspension of 100 mg. of chromium trioxide in 2 cc. of pyridine and allowed to stand for 3 hours at room temperature. After the addition of a little methanol and working up in the ordinary way 47 mg. of crystals are obtained. The latter are filtered in a benzene solution through a small column of aluminum oxide. After being recrystallized three times from a mixture of acetone and heptane Δ²⁰-3-keto-11β-hydroxy-5β-pregnene-18-acid lactone shows a constant melting point at 180–184° C. Optical rotation: $[\alpha] = +68°$; infra-red spectrum: bands at 5.68, 5.85, 6.04μ (shoulder) and 10.81μ in Nujol.

What is claimed is:

1. A member selected from the group consisting of a compound of the formula:

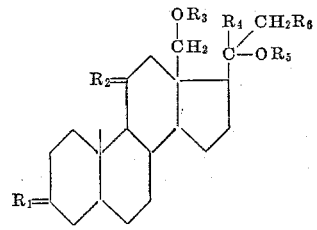

a compound of the formula:

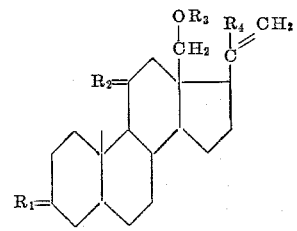

and a compound of the formula:

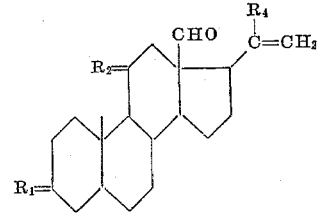

and derivatives thereof which have a double bond extending from the 5-carbon atom, in which formulae $R_1$ represents a member selected from the group consisting of a hydrogen atom together with a free hydroxyl group, a hydrogen atom together with an esterified hydroxyl group, a hydrogen atom together with an etherified hydroxyl group, an oxo group, an etherified enolized oxo group, an esterified enolized oxo group, and a ketalized oxo group, $R_2$ represents a member selected from the group consisting of 2 hydrogen atoms, a hydrogen atom together with a free hydroxyl group, a hydrogen atom together with an esterified hydroxyl group and an oxo group, $R_3$ a member selected from the group consisting of a hydrogen atom and an acyl group, $R_4$ a member selected from the group consisting of a hydrogen atom and a methyl group, $R_5$ a member selected from the group consisting of a hydrogen atom and an acyl group, $R_6$ a member selected from the group consisting of a hydrogen atom, a hydroxyl group and an acyloxy group, said esters being derived from carboxylic acids having from 1 to 20-carbon atoms selected from the aliphatic, aromatic, cycloaliphatic, araliphatic and aliphatic-cycloaliphatic series and the said ethers being derived from alcohols having from 1 to 8 carbon atoms selected from the aliphatic, heterocyclic and araliphatic series and said ketals being derived from lower alkylenediols said double bond extending from the 5-carbon atom being a 4:5-double bond when $R_1$ represents a member selected from the group consisting of a hydrogen atom together with a free hydroxyl group, a hydrogen atom together with an esterified hydroxyl group, a hydrogen atom together with an etherified hydroxyl group, an oxo group, and a 5:6-double bond when $R_1$ is a member selected from the group consisting of an etherified enolized oxo group, an esterified enolized oxo group, and a ketalized oxo group.

2. The 18,20β-dioxygenated-5β-pregnanes of the formula

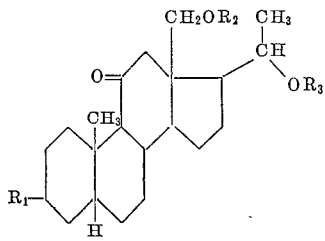

wherein $R_1$ is a member selected from the group consisting of =O,

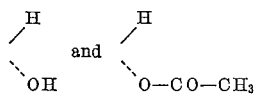

and $R_2$ and $R_3$ are members selected from the group consisting of H and —CO—CH$_3$.

3. 3β:18:20-trihydroxy-5α-pregnane.
4. 3β:18:20:21-tetrahydroxy-5α-pregnane.
5. 3α:11α:18:20-tetrahydroxy-5β-pregnane.
6. $\Delta^4$-3-keto-11α:18:20-trihydroxy-pregnene.
7. 3:11-diketo-18:20-dihydroxy-pregnane.
8. $\Delta^4$-3:11-diketo-18:20-dihydroxy-pregnane.
9. $\Delta^{20}$-3β:18-dihydroxy-5α-pregene.
10. $\Delta^{4;20}$-3-keto-11α:18-dihydroxy-pregnadiene.
11. $\Delta^{4;20}$-3-keto-11α:18-dihydroxy-20-methyl-pregnadiene.
12. $\Delta^{20}$-3:11:18-trioxo-pregene.
13. $\Delta^{20}$-3:18-dioxo-pregene.

14. Process for the manufacture of 18-acyloxy-pregnanes, wherein a member selected from the group consisting of an 18:20-oxido-pregnane unsubstituted in 18-position and a derivative thereof unsaturated in the nucleus is subjected to the action of an acylating agent, in the presence of a Lewis acid, said acylating agent being derived from a member selected from the group consisting of aliphatic carboxylic acids and aromatic carboxylic acids.

15. Process as claimed in claim 14, wherein acylation is carried out with an aliphatic acid anhydride in the presence of a Lewis acid.

16. Process as claimed in claim 15, wherein acylation is carried out with acetic acid anhydride and boron trifluoride etherate.

17. Process as claimed in claim 14, wherein acylation is carried out with an aliphatic acid anhydride in the presence of a strong acid.

18. Process as claimed in claim 17, wherein acylation is carried out with acetic acid anhydride in the presence of paratoluene-sulfonic acid.

19. Process as claimed in claim 14, wherein acylation is carried out with an aliphatic acid halide.

20. Process as claimed in claim 19, wherein acylation is carried out with acetyl bromide.

21. Process for the manufacture of $\Delta^{20}$-18-acetoxy-pregnenes and derivatives thereof further saturated in the nucleus, wherein a member selected from the group consisting of an 18-acetoxy-20-bromo-pregnane and a derivative thereof unsaturated in the nucleus is treated with collidine.

22. In a process for the production of compounds having the formula:

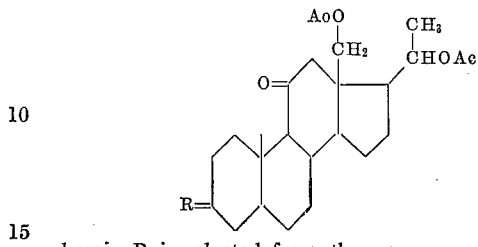

wherein R is selected from the group consisting of =O and

and Ac is selected from the group consisting of hydrogen and acetyl radical by reacting a compound of the formula

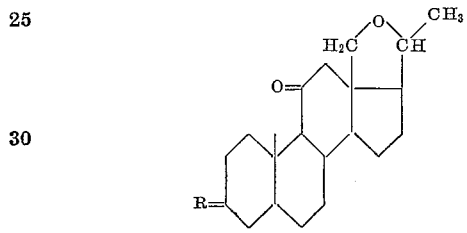

wherein R has the above definition with acetic anhydride in the presence of a catalyst, the improvement which consists of carrying out said reaction in the presence of a boron fluoride catalyst.

23. The process of claim 22, in which the boron fluoride is added in the form of a complex.

24. The process of claim 22, in which the boron fluoride is added in the free form.

25. The process of claim 22, in which the reaction is effected at a temperature between 0° and 40° C.

26. The process of claim 22, in which the reaction is effected in the absence of an additional solvent.

References Cited by the Examiner
UNITED STATES PATENTS
2,959,586   11/1960   Kerwin et al. _____ 260—239.55
2,973,375   2/1961    Johnson et al. _____ 260—239.55

OTHER REFERENCES
Fieser et al.: Steroids, Reinhold Pub. Corp., New York, N.Y. (1959), pages 621, 626 and 632.

Heusler et al.: Experientia, vol. 16, No. 1 (1960), pages 21–24.

Royals: Advanced Organic Chemistry, Prentice-Hall, Inc., Englewood Cliffs, N.J. (1954), page 333.

LEWIS GOTTS, *Primary Examiner.*

LESLIE H. GASTON, MORRIS LIEBMAN, *Examiners.*

M. L. WILLIAMS, H. A. FRENCH, *Assistant Examiners.*